United States Patent
King et al.

(10) Patent No.: US 9,822,901 B2
(45) Date of Patent: Nov. 21, 2017

(54) ACTUATOR ADAPTER FOR BONNET NUB STEM DESIGN

(71) Applicant: GE Oil & Gas Pressure Control LP, Houston, TX (US)

(72) Inventors: Anja King, Houston, TX (US); Blanca Estela Montoya, Houston, TX (US); Keith M. Adams, Houston, TX (US)

(73) Assignee: GE OIL & GAS PRESSURE CONTROL LP, Houston, TX (US)

( * ) Notice: Subject to any disclaimer, the term of this patent is extended or adjusted under 35 U.S.C. 154(b) by 46 days.

(21) Appl. No.: 14/315,152

(22) Filed: Jun. 25, 2014

(65) Prior Publication Data
US 2015/0377381 A1  Dec. 31, 2015

(51) Int. Cl.
| | |
|---|---|
| *F16K 31/126* | (2006.01) |
| *F16K 31/50* | (2006.01) |
| *F16K 3/02* | (2006.01) |
| *F16K 31/60* | (2006.01) |

(52) U.S. Cl.
CPC ............. *F16K 31/508* (2013.01); *F16K 3/02* (2013.01); *F16K 31/1262* (2013.01); *F16K 31/60* (2013.01); *Y10T 403/67* (2015.01)

(58) Field of Classification Search
CPC ...... F16K 31/1262; F16K 35/06; F16K 31/60; F16K 31/508; F16K 3/02; Y10T 403/67; Y10T 403/62; Y10T 403/56; B25G 3/30; E21B 17/042
USPC ...................... 251/291, 61.2–61.5, 63.5–63.6
See application file for complete search history.

(56) References Cited

U.S. PATENT DOCUMENTS

| | | | | |
|---|---|---|---|---|
| 386,263 | A * | 7/1888 | Pedersen | B23B 31/202 251/292 |
| 965,131 | A * | 7/1910 | Bliss | B23B 31/02 279/89 |
| 1,300,717 | A * | 4/1919 | Fulton | G05D 23/126 122/451.2 |
| 1,540,529 | A * | 6/1925 | Blaisdell | F16K 47/04 251/121 |
| 1,707,353 | A * | 4/1929 | Fraser | F16K 31/60 251/292 |
| 1,800,981 | A * | 4/1931 | Beste | F16K 31/60 16/432 |
| 2,108,234 | A | 2/1938 | Raymond | |

(Continued)

OTHER PUBLICATIONS

PCT Search Report and Written Opinion issued in connection with corresponding Application No. PCT/US2015/037072 on Oct. 1, 2015.

*Primary Examiner* — Kevin Murphy
*Assistant Examiner* — David Colon Morales
(74) *Attorney, Agent, or Firm* — Hogan Lovells US LLP

(57) ABSTRACT

An actuating apparatus for operating a valve assembly includes an actuator body that selectively couples to the valve assembly and an actuator stem that has an end that extends into the actuator body. The valve assembly has having a valve body, a valve member in the valve body, a valve stem attached to the valve member, and a profile on an end of the valve stem distal from the valve member. The actuating apparatus also includes an adapter assembly in the actuator body having a threaded end that engages the actuator stem, and a profiled end distal from the threaded end that engages the profile on the valve stem and couples to the valve stem, so that selectively applying axial forces to the adapter assembly moves the valve stem and the valve member.

8 Claims, 7 Drawing Sheets

(56) References Cited

U.S. PATENT DOCUMENTS

| | | | | |
|---|---|---|---|---|
| 2,280,892 | A * | 4/1942 | Cowles | F16L 33/221 285/243 |
| 3,240,520 | A * | 3/1966 | Dailey | B64D 1/02 279/37 |
| 3,472,269 | A * | 10/1969 | Scholle | F16K 31/163 137/312 |
| 3,648,718 | A | 3/1972 | Curran | |
| 3,958,592 | A * | 5/1976 | Wells | F16K 3/0254 137/237 |
| 3,967,847 | A * | 7/1976 | Ellis | B08B 9/426 198/803.9 |
| 3,980,325 | A * | 9/1976 | Robertson | F16L 19/08 285/249 |
| 4,199,131 | A * | 4/1980 | Boski | E21B 29/04 251/291 |
| 4,211,387 | A * | 7/1980 | Getchell | F16K 41/10 251/335.3 |
| 4,436,279 | A * | 3/1984 | Bonds | F16K 3/314 251/14 |
| 4,568,058 | A * | 2/1986 | Shelton | F16K 31/1221 251/196 |
| 4,585,207 | A * | 4/1986 | Shelton | F16K 3/186 251/196 |
| 4,693,497 | A | 9/1987 | Pettus et al. | |
| 5,052,430 | A | 10/1991 | Trautwein | |
| 5,161,278 | A * | 11/1992 | Tomm | A46B 5/0095 15/145 |
| 5,261,449 | A * | 11/1993 | Smetters | F16K 15/181 137/514 |
| 5,405,172 | A * | 4/1995 | Mullen, Jr. | F16L 5/06 174/652 |
| 5,579,804 | A * | 12/1996 | Roberts | F16K 35/06 137/385 |
| 5,803,431 | A * | 9/1998 | Hoang | E21B 29/04 251/326 |
| 6,015,134 | A * | 1/2000 | Johnson | F16K 31/1262 137/556 |
| 6,036,237 | A * | 3/2000 | Sweeney | F16L 25/0036 285/322 |
| 6,050,541 | A * | 4/2000 | Chatufale | F15B 15/1471 137/315.28 |
| 6,056,326 | A * | 5/2000 | Guest | F16L 21/04 285/314 |
| 6,056,472 | A * | 5/2000 | Latulippe | B29C 45/1775 403/299 |
| 6,089,531 | A * | 7/2000 | Young | F16K 31/1262 251/285 |
| 6,450,477 | B1 * | 9/2002 | Young | F16K 31/1262 251/285 |
| 6,598,849 | B2 * | 7/2003 | Hoang | E21B 21/10 251/62 |
| 6,688,268 | B2 | 2/2004 | Schlembach et al. | |
| 6,935,615 | B2 | 8/2005 | McCarty | |
| 6,939,074 | B2 | 9/2005 | Gethmann | |
| 7,469,876 | B2 * | 12/2008 | Fox | F16K 35/06 251/292 |
| 7,677,526 | B2 * | 3/2010 | Lymberopoulos | F16K 3/0254 137/75 |
| 2002/0109353 | A1 * | 8/2002 | Guest | F16L 19/086 285/322 |
| 2004/0155219 | A1 * | 8/2004 | McCarty | F16B 7/0426 251/357 |
| 2004/0216888 | A1 * | 11/2004 | Schmidt | F16K 39/04 166/377 |
| 2005/0001427 | A1 * | 1/2005 | Liew | F16L 37/002 285/322 |
| 2007/0164560 | A1 | 7/2007 | McCarty et al. | |
| 2010/0133812 | A1 * | 6/2010 | Williams | F16L 19/061 285/389 |
| 2011/0041923 | A1 * | 2/2011 | Enston | B25B 9/00 137/15.01 |
| 2011/0308619 | A1 * | 12/2011 | Martino | E21B 34/02 137/1 |
| 2012/0001103 | A1 * | 1/2012 | Kiesbauer | F16K 1/48 251/12 |
| 2012/0227983 | A1 * | 9/2012 | Lymberopoulos | E21B 34/02 166/373 |
| 2013/0291954 | A1 * | 11/2013 | Young | F16K 31/1262 137/15.23 |
| 2014/0138564 | A1 | 5/2014 | Adams et al. | |

\* cited by examiner

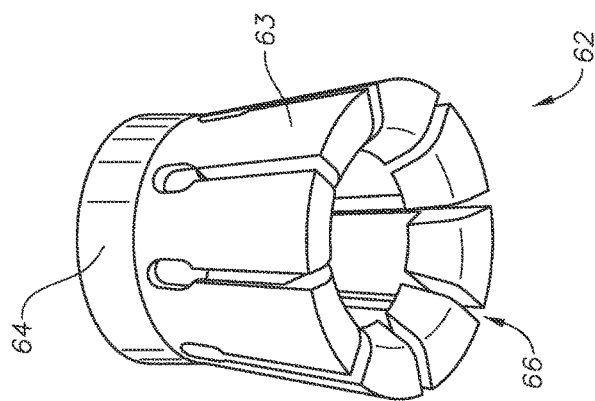
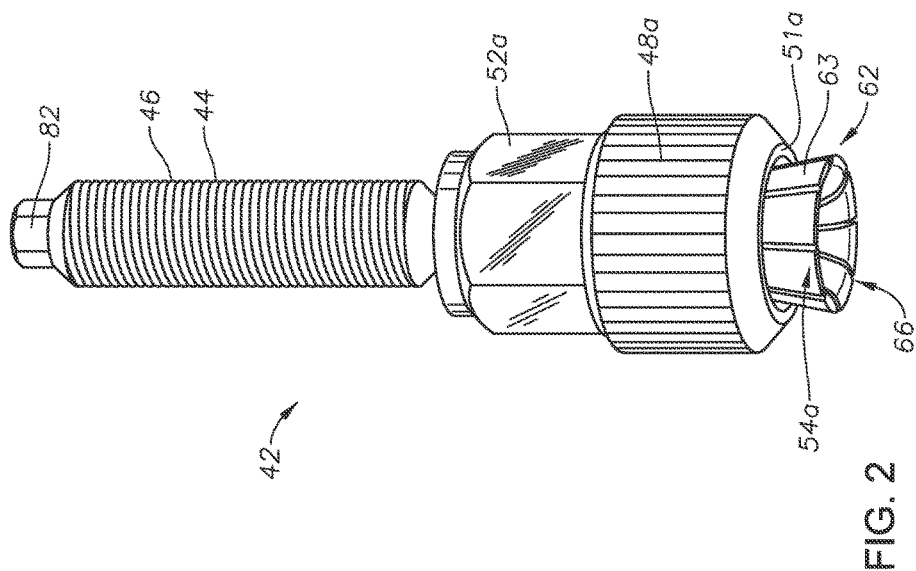

ACTUATOR ADAPTER FOR BONNET NUB STEM DESIGN

BACKGROUND OF THE DISCLOSURE

1. Field of the Disclosure

The present disclosure relates in general to valves associated with hydrocarbon recovery wells, and in particular to actuators to actuate valves. Yet more particularly, the present disclosure relates to an adapter for coupling together actuators of varying designs to valve stems.

2. Description of Related Art

Valves typically have a valve member attached to a linearly translating member, such as a stem, for moving the valve member between the open and closed positions. Some valves, such as gate valves, have an aperture that aligns with the bore to allow flow through the valve. The valve can be normally open, and thus the valve is closed when it is moved linearly to push the aperture out of alignment with the bore. Alternatively, a valve can be normally closed, and thus the valve is opened when it is moved linearly to position the aperture into alignment with the bore. Regardless of whether the valve is normally open or normally closed, the valve can be actuated, or moved between the open and closed position by a valve actuator.

Certain valve actuators have threaded downstops for connecting to the valve stem. If the valve stem is a nub stem instead of a threaded stem, an actuator with a threaded downstop would not be able to connect to the valve stem. Often valve actuators that have downstops with profiles, instead of threads, for mating with nub stems have to be assembled in a shop in order to compress the biasing member and insert a snap ring, to maintain the biasing member in a compressed position and trap the biasing member within the valve body. Having to use a press in a shop to disassemble or reassemble an actuator assembly requires moving the actuator assembly from the valve assembly location to a shop. Therefore certain operations, such as replacing parts, performing maintenance operations, or retrofitting a new actuator onto an existing valve cannot be undertaken in the field. Performing such operations in a shop with a press can be costly and time consuming and can lead to excess downtime of the systems to which the valve assembly is attached.

SUMMARY OF THE DISCLOSURE

Embodiments of the current disclosure provide systems and methods for attaching an actuating apparatus to a valve assembly that can be accomplished in the field without the need for dissembling or assembling the actuator apparatus in a shop with a press. Embodiments of the current disclosure also provide systems and methods for attaching an actuator that has a threaded downstop to a valve assembly that has a stem nub, providing an adapter between the threaded connection and the nub connection. Embodiments of the current disclosure therefore allow operators to utilize a broader range of actuators for existing valve assemblies that have stem nubs, when replacing the actuator assemblies on existing valve assemblies or when installing new valve assemblies.

In systems and methods of the current disclosure, an actuating apparatus for operating a valve assembly are disclosed, the valve assembly having a valve body, a valve member in the valve body, a valve stem attached to the valve member, and a profile on an end of the valve stem distal from the valve member. The actuating apparatus includes an actuator body that selectively couples to the valve assembly. An actuator stem has an end that extends into the actuator body. An adapter assembly in the actuator body has a threaded end that extends towards the actuator stem, and a profiled end distal from the threaded end that engages the profile on the valve stem and couples to the valve stem, so that selectively applying axial forces to the adapter assembly moves the valve stem and the valve member.

In alternate embodiments of the current disclosure, an actuating apparatus for actuating a valve assembly includes an actuator body with a proximal portion and a distal portion, the proximal portion having a connector that selectively couples to the valve assembly. An actuator stem has an end that extends into the actuator body. An adapter assembly is located within the actuator body. The adapter assembly includes: an adapter shaft having external threads on a threaded end; a connector housing located at a connecting end of the adapter shaft that is distal from the threaded end and having an inner cavity that is open at an end of the connector housing opposite the adapter shaft; and a connector collar assembly located within the inner cavity, the connector collar assembly having a radial shoulder that engages a stem nub of the valve assembly. An actuator downstop engages the actuator stem. A biasing member has a static end that engages the valve assembly and a dynamic end that travels axially with the actuator downstop, the biasing member urging the actuator downstop away from the proximal portion of the actuator body.

In another alternate embodiment of the current disclosure, a method for mounting an actuating apparatus to a valve assembly is disclosed. The valve assembly has a valve body, a valve member in the valve body, a valve stem attached to the valve member, and a profile on an end of the valve stem distal from the valve member. The method includes connecting a proximal portion of an actuator body to the valve assembly. An adapter assembly is provided, the adapter assembly having a threaded end and a profiled end distal from the threaded end. The profile of the valve stem is engaged with the profiled end of the adapter assembly. A static end of a biasing member is placed on the valve assembly and a dynamic end of the biasing member is retained with an actuator downstop of the actuating apparatus. The actuator downstop is threaded onto the threaded end of the adapter assembly, compressing the biasing member between the valve assembly and the actuator downstop. A distal portion of the actuator body is secured to the proximal portion.

BRIEF DESCRIPTION OF THE DRAWINGS

So that the manner in which the features, advantages and objects of the disclosure, as well as others which will become apparent, are attained and can be understood in more detail, more particular description of the disclosure briefly summarized above may be had by reference to the embodiment thereof which is illustrated in the appended drawings, which drawings form a part of this specification. It is to be noted, however, that the drawings illustrate only a preferred embodiment of the disclosure and is therefore not to be considered limiting of its scope as the disclosure may admit to other equally effective embodiments.

FIG. 2 is a perspective view of an example of an adaptor apparatus of the actuating apparatus of FIG. 1, in accordance with an embodiment of this disclosure.

FIG. 3 is a perspective view of a portion of the adaptor apparatus of FIG. 2.

DETAILED DESCRIPTION OF THE DISCLOSURE

The system and method of the present disclosure will now be described more fully hereinafter with reference to the accompanying drawings which illustrate embodiments of the disclosure. The system and method if this disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art. Like numbers refer to like elements throughout, and the prime notation, if used, indicates similar elements in alternative embodiments.

Figure 1:
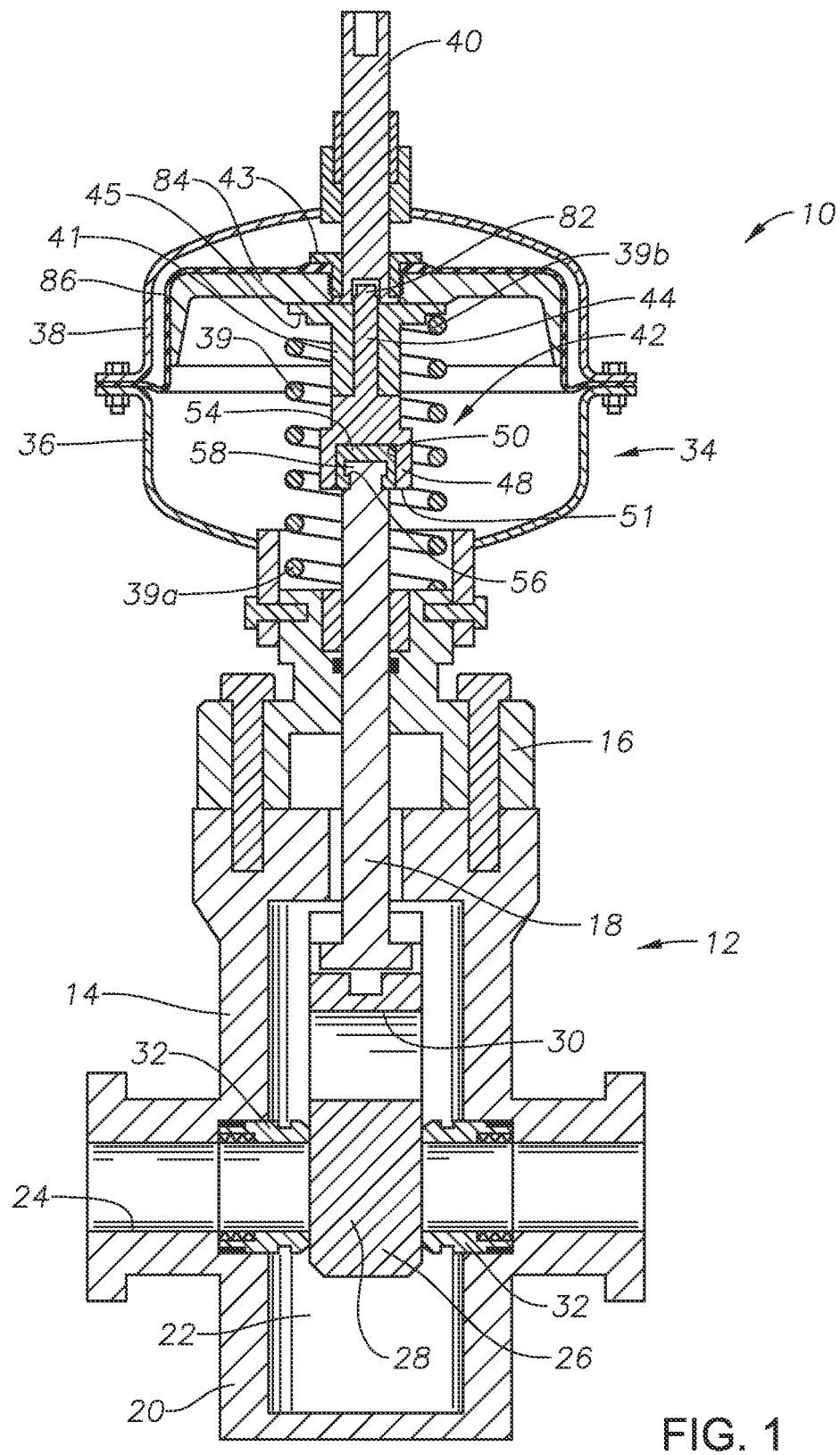
FIG. 1 is a schematic sectional view of an example of a valve assembly connected to an actuating apparatus in accordance with an embodiment of this disclosure.
Figure 4:
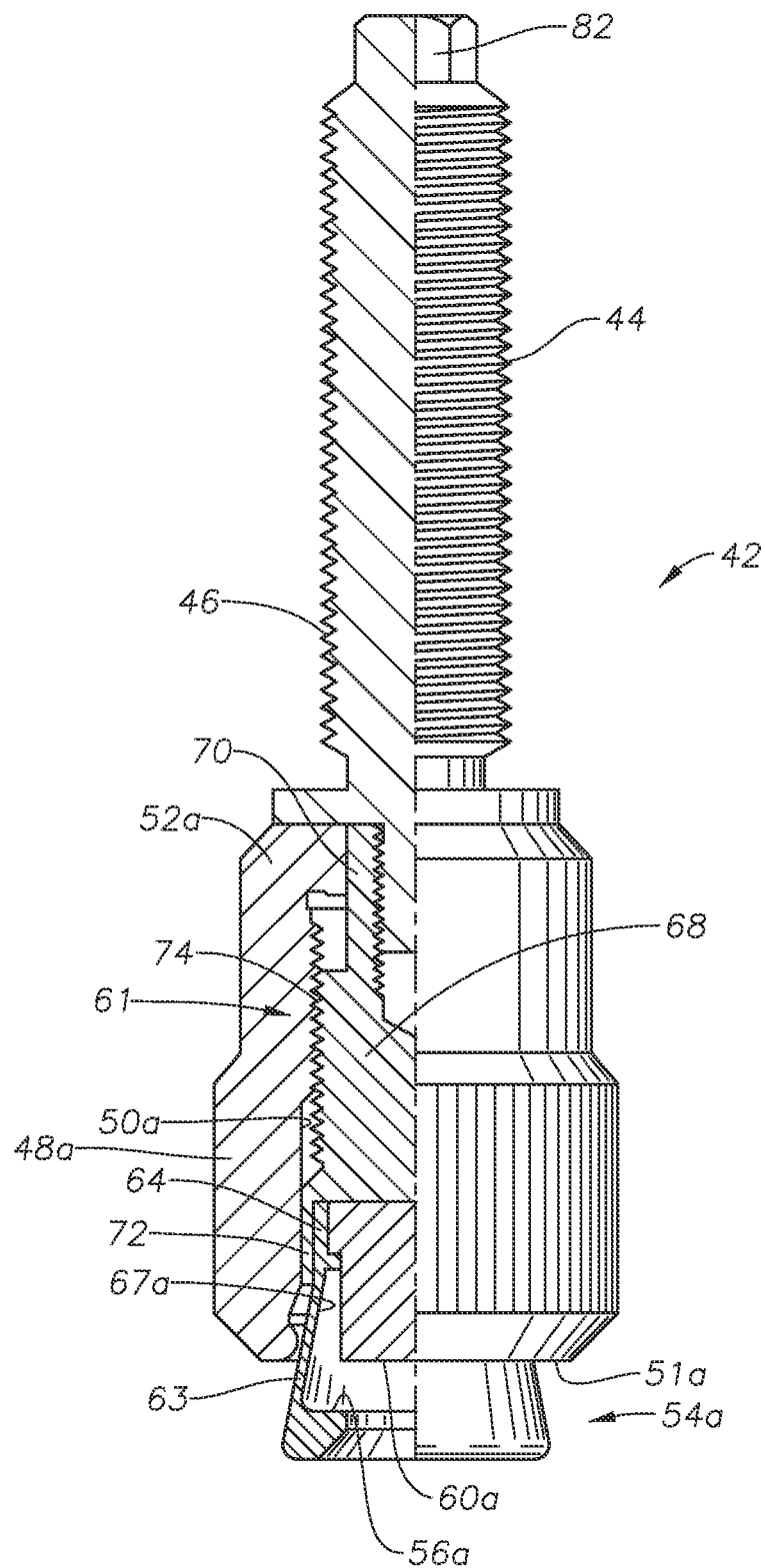
FIG. 4 is a partial section view of the adaptor apparatus of FIG. 2.

Referring to FIG. 1, actuator 10 is shown attached to valve assembly 12. Valve assembly 12 includes valve 14 and bonnet 16. Actuator 10 is used to open or close valve 14. Valve assembly 12 can be, for example associated with a surface wellhead assembly that is disposed over a well (not shown). The wellhead assembly can include a wellhead housing, a production tree over the housing and flow lines connected to the tree or the wellhead assembly. The flow lines and wellhead assembly can include embodiments of valve assembly 12 described herein. Valve assembly 12 can also be used for regulating fluids that communicate with a subsea or surface wellhead assembly, or for regulating well and other fluids that are otherwise travelling along a pipeline. Bonnet 16 is connected to the body of valve assembly 12. Valve stem 18 passes through bonnet 16. Actuator 10 is used to actuate valve 14 by urging valve stem 18 axially with respect to valve 14. In the embodiment of FIG. 1, moving valve stem 18 towards valve 14 will cause valve 14 to open. In alternate embodiments, moving valve stem 18 towards valve 14 will cause valve 14 to close.

Valve 14 is shown, as an example, as a gate valve with valve body 20 housing chamber 22 therein. Passage 24 formed through valve body 20 intersects chamber 22. Valve member 26 is shown within chamber 22. An end of valve stem 18 is attached to valve member 26. Valve member 26 can be a gate that is a generally planar member having solid portion 28 and opening 30 formed through solid portion 28. Valve member 26 is selectively slidable within chamber 22. Annular valve seats 32 are shown co-axially located in passage 24, each having an end extending into chamber 22. In the embodiment shown in FIG. 1, valve member 26 is closed with solid portion 28 blocking passage 24. Although valve 14 is shown as a gate valve, as one of skill in the art will appreciate, valve 14 can be any other type of valve that is actuated by the linear extension or translation of a linear member.

Actuator 10 is an actuating apparatus for mounting to a valve assembly 12. Actuator 10 of an embodiment of this disclosure includes actuator body 34 shown having a generally cylindrical outer surface with an internal cavity. Actuator body 34 includes proximal portion 36 and distal portion 38, which are generally relatively thin walled members that when assembled as shown define an open space in actuator 10. Proximal portion 36 and distal portion 38 can be connected to each other with connectors such as bolts or other known means, to form actuator body 34. Proximal portion 36 has an opening through its sidewall opposite distal portion 38 that receives a fitting for selectively releasably coupling to bonnet 16 of valve assembly 12. Distal portion 38 has an orifice through its top on an end opposite proximal portion 36. Actuator stem 40 has an outer end that extends through the orifice in distal portion 38 of actuator body 34.

Biasing member 39 is shown coaxially disposed in actuator body 34 and having a static end 39a abutting an upper terminal end of bonnet 16 and a dynamic end 39b on an end opposite static end 39a. Dynamic end 39b travels axially with actuator downstop 41, which in turn engages an inner end of actuator stem 40. Biasing member 39 urges actuator downstop 41 away from proximal portion 36 of actuator body 34. Biasing member 39 can be, for example, a spring. Actuator downstop 41 is an annular member oriented generally coaxial with valve stem 18. Actuator downstop 41 has a downstop shoulder 45, which is a radial downward facing surface. Downstop shoulder 45 engages dynamic end 39b of biasing member 39.

Actuator 10 of the example of FIG. 1 is a diaphragm actuator; however, embodiments of adaptor assembly 42 can be used with any type of linear actuator, such as a hydraulic or pneumatic actuator, with a threaded downstop. Adapter assembly 42 can be selectively located within actuator body 34. Adapter assembly 42 and portions thereof, can be seen in FIGS. 1-9. Adapter assembly 42 includes adapter shaft 44. Adapter shaft 44 is an elongated cylindrical member having a threaded end and a profiled end distal from the threaded end. The threaded end of adapter shaft 44 has external threads 46 that extend from a location proximate to the end of adapter shaft 44. External threads 46 can be used to connect adapter assembly 42 to actuator downstop 41.

The profiled end of adapter shaft 44 includes connector housing 48. Connector housing 48 has an inner cavity 50 that is open at an end of connector housing 48 opposite adapter shaft 44. Connector housing 48 has an annular housing end surface 51 facing away from adapter shaft 44 for selectively mating with valve assembly 12. When housing end surface 51 meets an opposite facing surface of valve assembly 12, further axial movement of adapter shaft 44 will be limited. In the illustrated example, an outer diameter of connector housing 48 is greater than an outer diameter of adapter shaft 44. Adapter shaft 44 can be located directly adjacent to connector housing 48. Connector housing 48 can include an adapter middle portion 52 that is adjacent to adapter shaft 44. As shown, the outer diameter of adapter middle portion 52 is greater than the outer diameter of adapter shaft 44 and less than the outer diameter of the end portion of connector housing 48. In certain embodiments, the outer diameter of adapter middle portion 52 can be substantially similar to an outer diameter of actuator downstop 41.

Adapter assembly 42 further includes connector collar assembly 54. When adapter assembly 42 is fully assembled, connector collar assembly 54 is located within inner cavity 50. Connector collar assembly 54 has an inner bore for receiving stem nub 58 and coupling the profiled end of adapter assembly 42 to the valve stem 18 so that selectively applying axial forces to adapter assembly 42 moves valve stem 18 and valve member 26. Radial shoulder 56 within the inner bore of connector collar assembly 54 is defined by a transition of an inner diameter of the inner bore from a smaller inner diameter at an open end of the inner bore to a larger inner diameter of the inner bore. Radial shoulder 56 engages a stem nub 58 of valve assembly 12. Stem nub 58 is a profile located at an end of valve stem 18 that is distal from and opposite to the end of valve stem 18 that is connected to valve member 26.

Connector collar assembly 54 includes collar end surface 60. Collar end surface 60 faces away from adapter shaft 44 and lands on an end of stem nub 58. Collar end surface 60 provides an axial load transfer path between adapter shaft 44 and valve assembly 12. Adapter assembly 42 has a retainer 61 that attaches connector collar assembly 54 to connector housing 48. As described in more detail below, retainer 61 can be, for example, collet connector threads 74 of the embodiment of FIGS. 2-5a-c, or fastener members 80 of the embodiment of FIGS. 6-9.

In the embodiment of FIGS. 2-5a-c, connector collar assembly 54a includes a frusto-conical shaped collet member 62 with axial slots formed through the sidewalls that define a plurality of generally axially oriented collet fingers 63 that extend axially and somewhat radially outward from a ring shaped collet band 64. Each collet finger 63 has a radially curved outer diameter surface that together form the frusto-conical shape of connector collar assembly 54a of the embodiment of FIGS. 2-5a-c. Each collet finger 63 has a radially curved inner diameter surface that together form an inner bore 67a of collet member 62 for receiving stem nub 58. A lower end of each collet finger 63 projects radially inward to form the radial shoulder 56a on the inner circumference of connector collar assembly 54a. Radial shoulder 56a defines a transition of an inner diameter of inner bore of 67a from a smaller inner diameter at an open end of inner bore 67a to a larger inner diameter of inner bore 67a. Radial shoulder 56a selectively circumscribes substantially 360 degrees of stem nub 58. Radial shoulder 56a of the embodiments of FIGS. 2-5a-c may not circumscribe exactly 360 degrees of stem nub 58 and support 100% of opposing radial shoulder 65 of stem nub 58, due to gaps 66 between collet fingers 63. As an example, radial shoulder 56a contacts 80% or more of the surface area of opposing radial shoulder 65 of stem nub 58. In an ideal embodiment, radial shoulder 56a contacts 90% or more of the surface area of opposing radial shoulder 65 of stem nub 58.

Figure 5A:
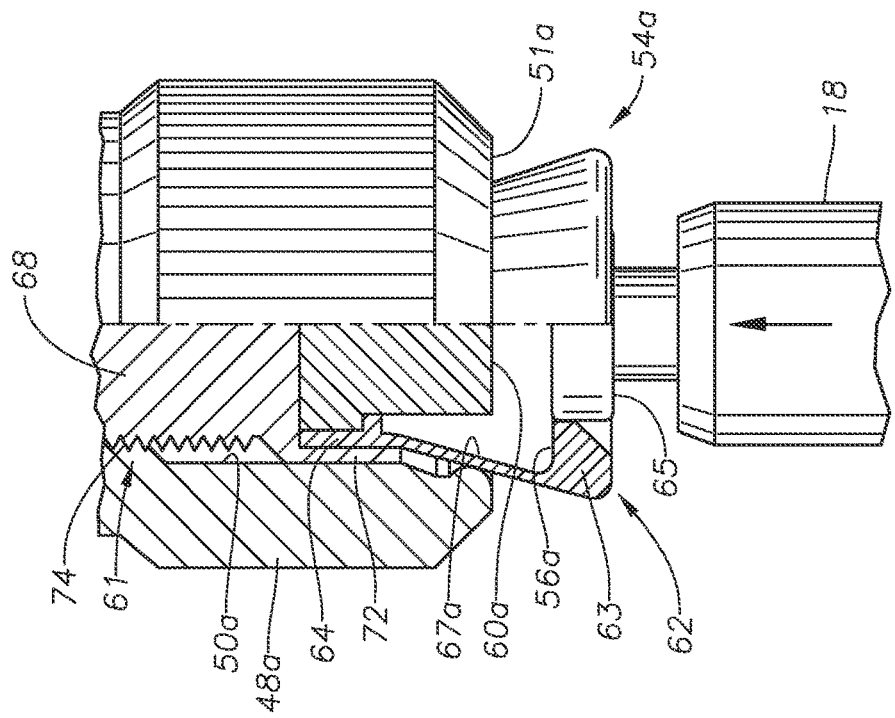
FIG. 5a is a partial section view of a portion of the adaptor apparatus of FIG. 2, shown at an early stage of the process of being connected to a stem nub of the valve assembly.
Figure 5B:
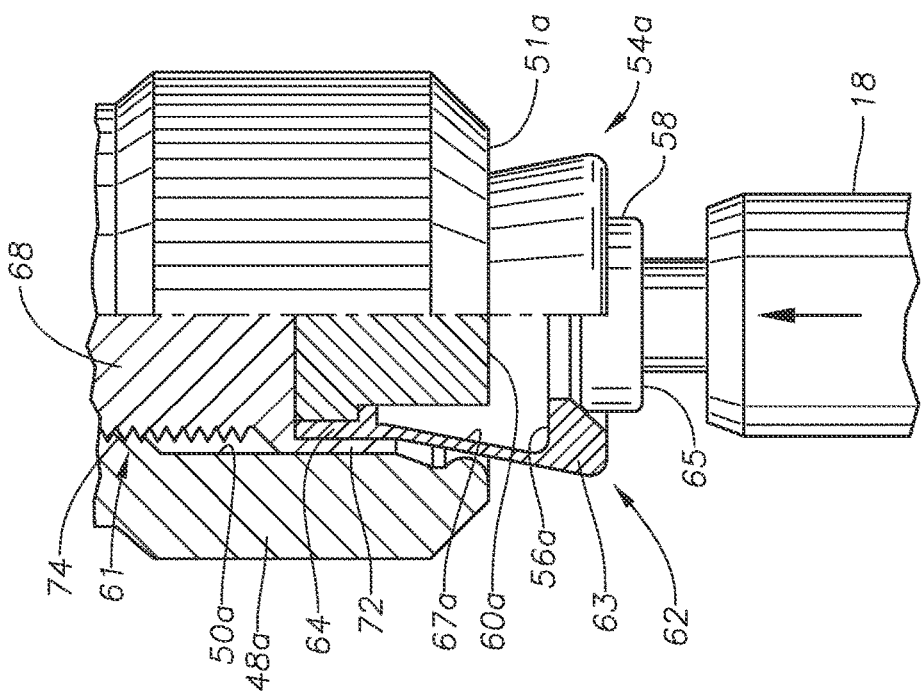
FIG. 5b is a partial section view of a portion of the adaptor apparatus of FIG. 2, shown at a middle stage of the process of being connected to a stem nub of the valve assembly.
Figure 7:
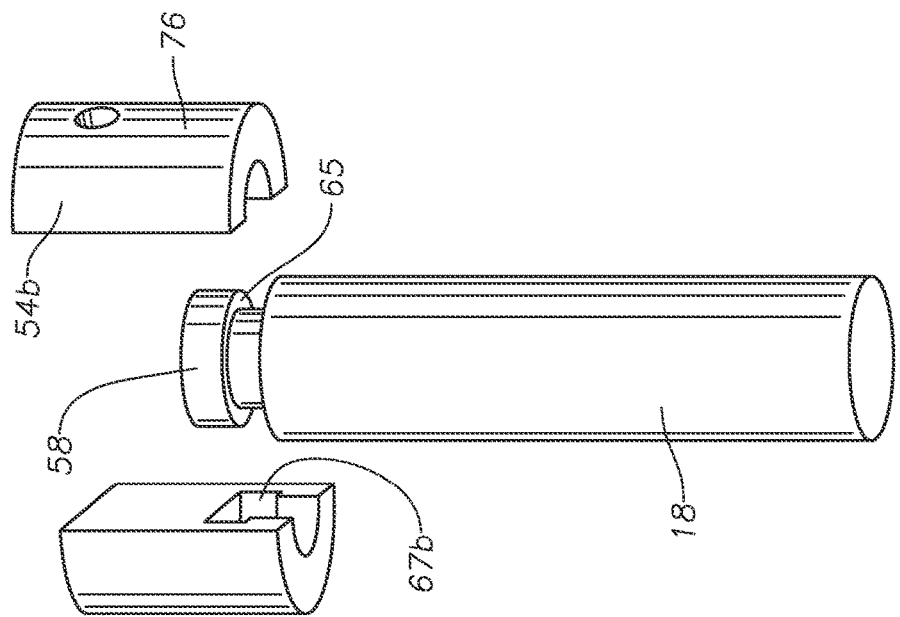
FIG. 7 is a perspective view of a connector collar assembly of the adaptor apparatus of FIG. 6, shown being attached to the stem nub of the valve assembly.
Figure 5C:
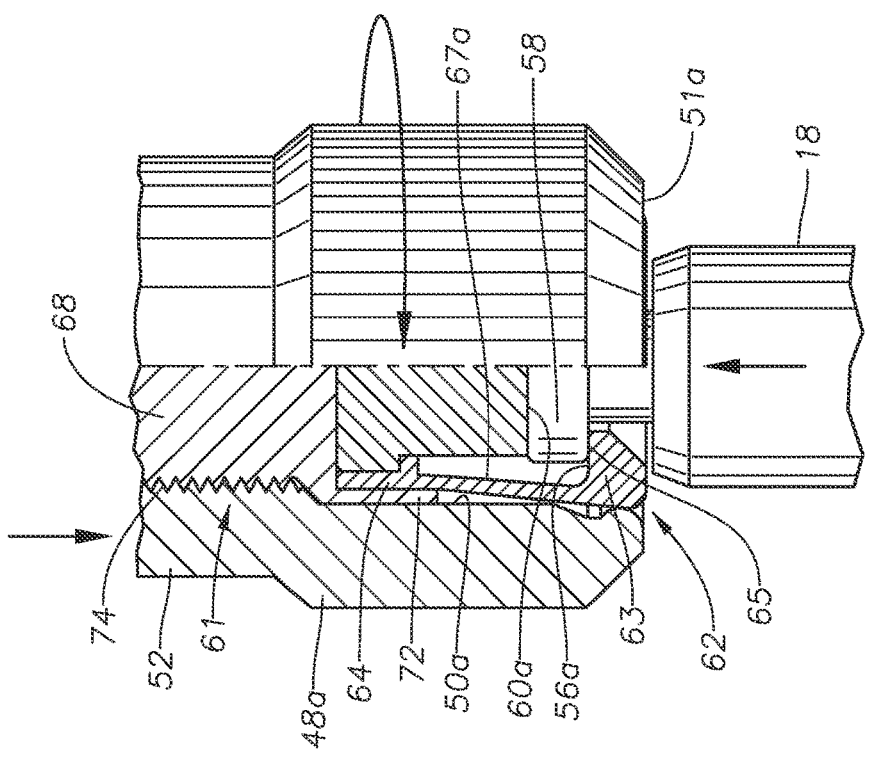
FIG. 5c is a partial section view of a portion of the adaptor apparatus of FIG. 2, shown connected to a stem nub of the valve assembly.

Gaps 66 separate each collet finger 63 from each other. Gaps 66 can have a semi circular shape proximate to collet band 64 and otherwise define generally parallel sides of each collet finger 63. When connector collar assembly 54a couples to stem nub 58 (FIG. 5c), a portion of gaps 66 proximate to an end of the collect fingers 63 will become smaller relative to when connector collar assembly 54a is not coupled to valve assembly 12 (FIG. 5a). Connector collar assembly 54a can further include a cylindrical collar union 68. Collar union 68 has a first end 70 connected to adapter shaft 44 and a second end 72 connected to collet member 62. First end 70 of collar union 68 can be, for example, threaded to an extended portion of adapter shaft 44. In the example of FIGS. 2-5a-c, the extended portion of adapter shaft 44 includes external threads 46 that mate with internal threads in a bore of collar union 68 at first end 70 of collar union 68. The opposite second end 72 of collar union 68 has a larger outer diameter relative to first end 70 of collar union 68. A second bore of collar union 68 located at second end 72 of collar union 68 receives a portion of collet member 62 and retains collet member 62. For example, collet member 62 can be threaded to second end 72 of collar union 68 or can be secured with a snap ring or other known means.

Continuing with the embodiment of FIGS. 2-5a-c, between first and second ends 70, 72 of collar union 68 are collet connector threads 74. Collet connector threads 74 act as retainer 61, retaining connector collar assembly 54a within inner cavity 50a when connector collar assembly 54a is located within inner cavity 50a. Inner cavity 50a extends through connector housing 48a, including into adapter middle portion 52a. Collet connector threads 74 mate with internal threads of inner cavity 50a. Connector housing 48a operates as a rotating nut. Connector housing 48a can have a textured surface for gripping to assist with the rotation of connector housing 48a, and adapter middle portion 52a of connector housing 48a can have an outer diameter formed to accept a tool to rotate connector housing 48a. When connector housing 48a is rotated, internal threads of inner cavity 50a of connector housing 48a engage collet connector threads 74, causing connector housing 48a to move axially away from or towards adapter shaft 44, depending on the direction of rotation. When connector housing 48a moves axially away from adapter shaft 44, connector housing 48a will move axially over collet member 62, circumscribing a greater axial length of collet member 62 and causing collet fingers 63 to move radially inward so that radial shoulder 56a can engage and support opposing radial shoulder 65 of stem nub 58.

Looking at FIGS. 6-9, in an alternate embodiment, connector collar assembly 54b includes a plurality of collar members, partial cylindrical members 76, which together make up a cylindrical shaped collar 78. Partial cylindrical members 76 are axially split members of cylindrical shaped collar 78 so that each partial cylindrical member 76 has a radially curved outer surface and an inner surface having one or more substantially planar surfaces. In the embodiment of FIGS. 6-9, there are two partial cylindrical members 76, each having a semi-cylindrical outer surface and a single planar inner surface. In alternate embodiments, there may be more than two partial cylindrical members 76.

Still looking at FIGS. 6-9, each of the partial cylindrical members 76 has a portion of an inner bore 67b for receiving stem nub 58. Radial shoulder 56b defines a transition of an inner diameter of inner bore 67b from a smaller inner diameter at an open end of inner bore 67b to a larger inner diameter of inner bore 67b. Each partial cylindrical member 76 has recess formed into its inner surface that creates a curved portion of radial shoulder 56b, so that when partial cylindrical members 76 are assembled to form cylindrical shaped collar 78, radial shoulder 56b selectively circumscribes substantially 360 degrees of stem nub 58 and radial shoulder 56b is in contact with 80% to 100% of opposing radial shoulder 65 of stem nub 58.

When connector collar assembly 54b is located within inner cavity 50b, fastener members 80 can retain connector collar assembly 54b within inner cavity 50b. Fastener members 80 act as retainers 61 and attach connector collar assembly 54b to connector housing 48b. Fastener members 80 extend radially inward through a sidewall of connector housing 48b and into connector collar assembly 54b. Fastener members 80 can be, for example, threaded members such as bolts or screws, or can be pins or other known connectors. Connector housing 48b is shown with an integrally formed adapter middle portion 52b.

In an example of operation, looking at FIGS. 1-9, actuator 10 is to be mounted to valve assembly 12. If actuator 10 is being used to replace a prior actuator, the prior actuator would first be removed. Valve stem 18 is exposed at an end of valve assembly 12. Proximal portion 36 of actuator body 34 is connected to valve assembly 12. Proximal portion 36 of actuator body 34 can be connected to valve assembly 12 with bolts, threads, clamps, snap-rings or other known connection means. Connector collar assembly 54 can then circumscribe stem nub 58 and be secured within inner cavity 50b of connector housing 48 so that radial shoulder 56 of connector collar assembly 54 can engage and support opposing radial shoulder 65 of stem nub 58.

In the embodiment of FIGS. 2-5a-c, connector collar assembly 54a circumscribes stem nub 58 by axially moving stem nub 58 into the open end of inner bore 67a. Looking at FIG. 5a, the outer diameter of stem nub 58 is greater than the inner diameter of connector collar assembly 54a at the open end of inner bore 67a. Looking at FIG. 5b, as stem nub 58 enters inner bore 67a, the ends of collet fingers 63 are forced radially outward to accommodate the outer diameter of stem nub 58. For example, collet fingers 63 may move radially outward 2 degrees to 10 degrees and in an embodiment, may move radially outwards 6 degrees, in each case relative to the relaxed position of collect fingers 63. Turning to FIG. 5c, stem nub 58 is moved axially into inner bore 67a until an end of stem nub 58 mates with collar end surface 60a. End surface 60a can be integrally formed with collar union 68 or as illustrated, can be parts of a separate stop member located adjacent to collar union 68. After the larger diameter portion of stem nub 58 passes the smaller inner diameter portion of inner bore 67a, collet fingers 63 will no longer be pushed radially outward by the inner diameter surface of inner bore 67a.

Looking again at FIGS. 2-5a-c, in order to secure connector collar assembly 54a within inner cavity 50a, connector housing 48a can be rotated relative to connector collar assembly 54a so that collet connector threads 74 mate with internal threads of inner cavity 50a of connector housing 48a, moving connector housing 48a away from adapter shaft 44 and axially over connector collar assembly 54a. Connector housing 48a will circumscribe a greater axial length of collet member 62 so that a larger portion of collet member 62 is within inner cavity 50a of connector housing 48a. This will cause an inner surface of inner cavity 50a to push collet fingers 63 radially inward so that radial shoulder 56a can engage and support opposing radial shoulder 65 of stem nub 58. Collet fingers 63 may move radially inward 2 degrees to 10 degrees and in an embodiment, may move radially inward 6 degrees, in each case relative to the relaxed position of collect fingers 63.

Figure 6:
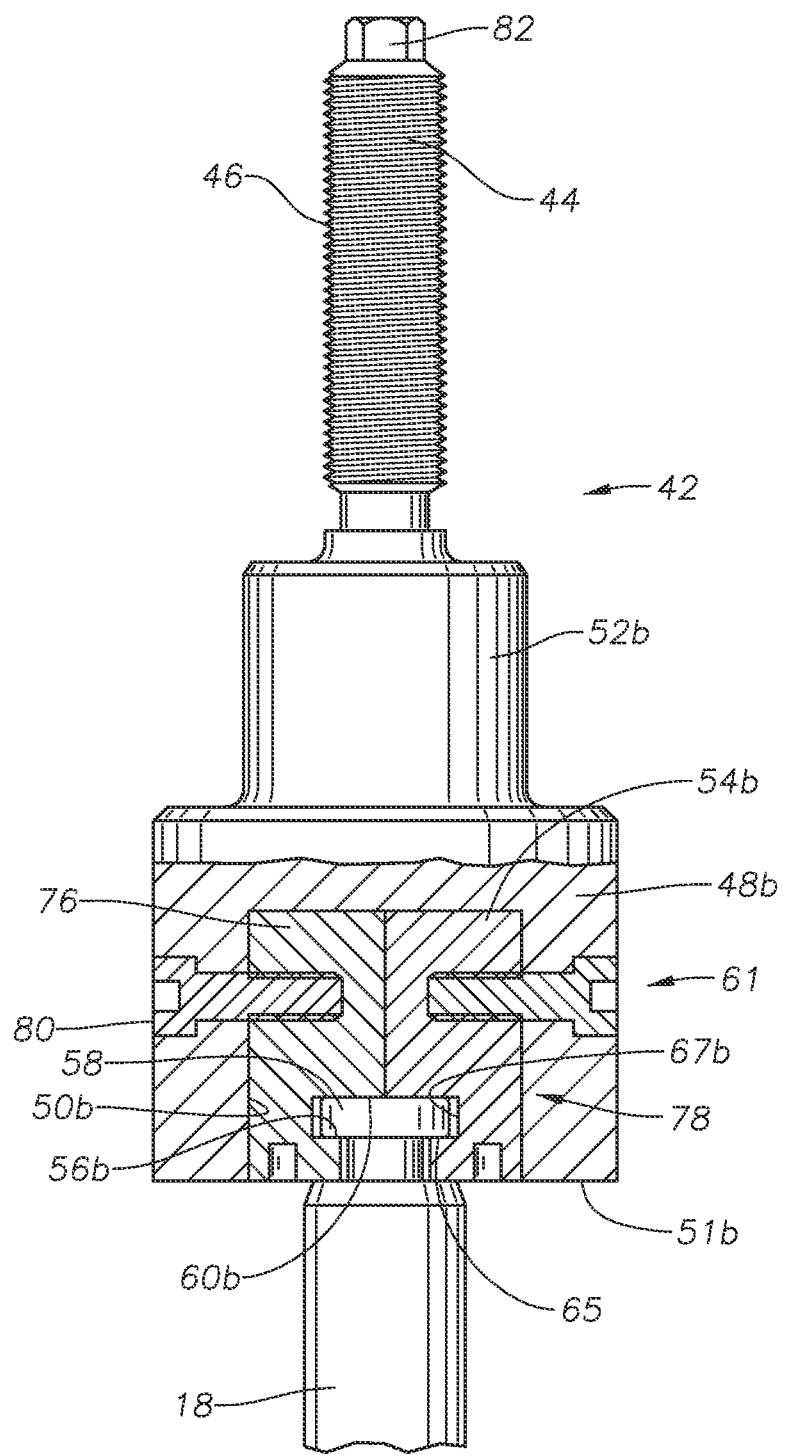
FIG. 6 is a section view of an example of an adaptor apparatus of the actuating apparatus of FIG. 1, in accordance with an embodiment of this disclosure.
Figure 8:
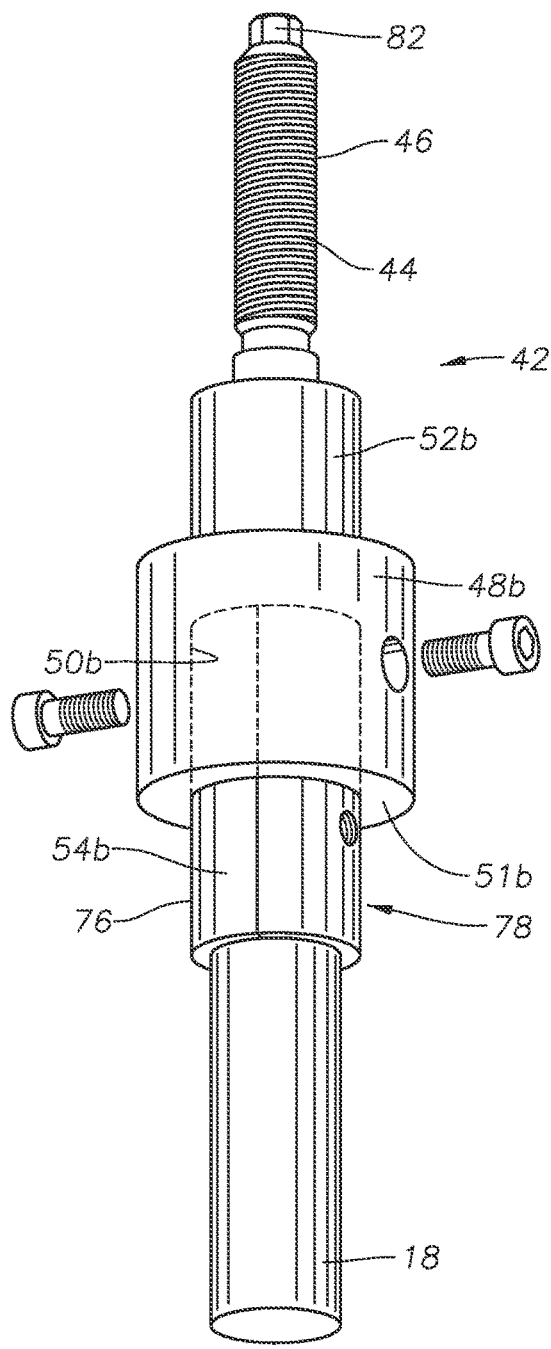
FIG. 8 is a perspective view of the connector collar assembly of the adaptor apparatus of FIG. 6, shown attached to the stem nub of the valve assembly and being inserted into the connector housing.
Figure 9:
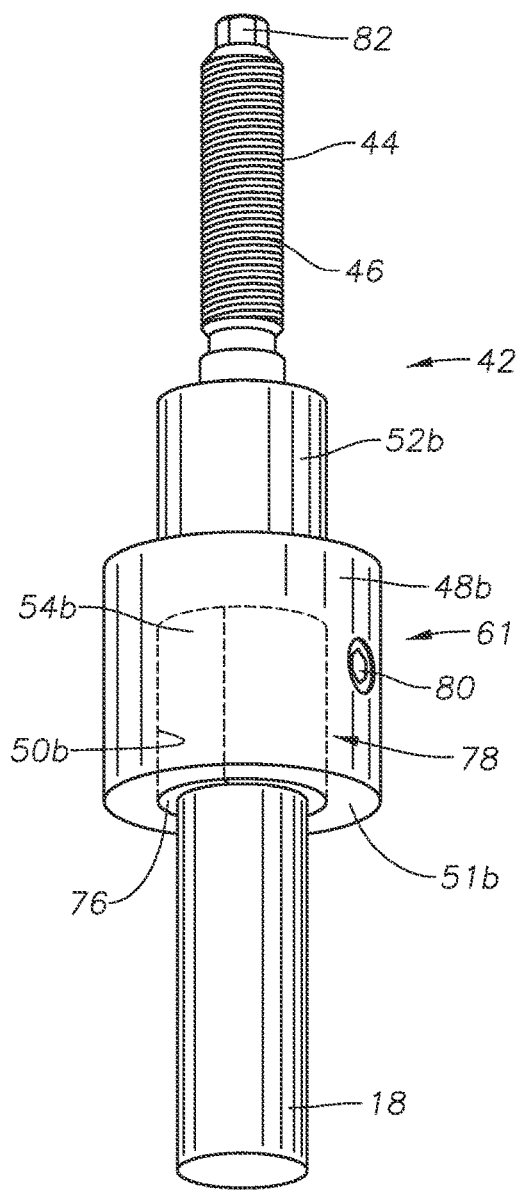
FIG. 9 is a perspective view of the connector collar assembly of the adaptor apparatus of FIG. 6, shown attached to the stem nub of the valve assembly and secured within the connector housing.

Turning to the embodiment of FIGS. 6-9, connector collar assembly 54b circumscribes stem nub 58 by positioning partial cylindrical members 76 around stem nub 58. Looking at FIG. 7 stem nub 58 is located within inner bore 67b so that the end of stem nub 58 mates with collar end surface 60b and radial shoulder 56b can engage and support opposing radial shoulder 65 of stem nub 58. Looking at FIG. 8, cylindrical shaped collar 78 is then located within inner cavity 50b of connector housing 48b. Turning to FIGS. 6 and 9, in order to secure connector collar assembly 54b within inner cavity 50b, fastener members 80 can be extended radially through a sidewall of connector housing 48b and into connector collar assembly 54b and threaded into place in threaded holes of partial cylindrical members 76.

Now looking at FIGS. 1-9, after connector collar assembly 54b is secured within inner cavity 50, static end 39a of biasing member 39 can be located on bonnet 16. Actuator downstop 41 can be positioned at dynamic end 39b of biasing member 39 to retain dynamic end 39b (FIG. 1). Actuator downstop 41 is then threaded onto adapter shaft 44 to compress biasing member 39 between bonnet 16 of the valve assembly 12, and actuator downstop 41. Actuator downstop 41 can be threaded onto adapter shaft 44 until and end of actuator downstop 41 mates with an opposite facing end of connector housing 48. Biasing member 39 will therefore apply axial forces on actuator downstop 41, urging actuator downstop 41 away from valve assembly 12. As actuator downstop 41 is threaded onto adapter shaft 44, actuator downstop 41 is rotated relative to adapter shaft 44. In order to prevent rotation of adapter shaft 44 during this process, anti-rotation member 82 will be gripped with a tool. Anti-rotation member 82 can be, for example, a profile, such as a wrench flat, located at the threaded end of adapter assembly 42 that can be engaged with a matching profile of the tool.

Distal portion 38 of actuator body 34 can then be secured to proximal portion 36 and any other portions of actuator 10 can be assembled. In the embodiment of FIG. 1, the outer end of actuator stem 40 is extended through the orifice in distal portion 38 of actuator body 34. An inner end of actuator stem 40 rests on top of and engages a top surface of actuator downstop 41. The inner end of actuator stem 40 has a receptacle for receiving anti-rotation member 82. Because the example actuator 10 of FIG. 1 is a diaphragm actuator, diaphragm plate 84 will be located within actuator body 34 and diaphragm 86 will be supported on diaphragm plate 84. A lower surface of diaphragm plate 84 rests on top of, and engages a top surface of, actuator downstop 41.

Retaining nut 43 is secured to diaphragm plate 84 and an inner edge of diaphragm 86 is sandwiched between retaining nut 43 and diaphragm plate 84. An outer edge of diaphragm 86 is sandwiched between distal and proximal portions 36, 38 of actuator body 34. A lower lip of actuator stem 40 engages a bottom of retaining nut 43, limiting the upward axial movement of actuator stem 40 relative to diaphragm plate 84.

In order to operate valve 14, pressure media will be injected through a port (not shown) in distal portion 38 and will act on diaphragm 86, pushing diaphragm plate 84 towards valve assembly 12. As diaphragm plate 84 moves towards valve assembly 12, actuator downstop 41, will also move towards valve assembly 12, overcoming the force of biasing member 39. This causes adapter assembly 42 to move valve stem 18 towards valve assembly 12, actuating valve 14. When housing end surface 51 meets an opposite facing surface of valve assembly 12, further axial movement of adapter shaft 44 will be limited. If pressure media forces are sufficiently reduced on diaphragm 86, biasing member 39 will urge actuator downstop 41 back away from proximal portion 36. Being connected to actuator downstop 41, adapter assembly 42 will also move away from proximal portion 36, causing valve 14 to move to an unactuated position.

Therefore, as described herein the actuating apparatus, actuator 10, can be assembled with a valve assembly 12 without the need for assembling the actuator 10 in a shop with a press and instead such assembly can be performed at the on site location of valve assembly 12. Instead of compressing biasing member 39 with a press and securing it within actuator body 34 in a shop, biasing member 39 can be compressed and secured in place by the process of threading actuator downstop 41 onto adapter shaft 44. In addition, adapter assembly 42 provides a system and method of connecting an actuator 10 with a threaded actuator downstop 41 to a valve assembly 12 with a stem nub 58.

The terms "vertical", "horizontal", "upward", "downward", "above", and "below" are used herein only for convenience because elements of embodiments of this disclosure may be utilized in various positions.

The system and method described herein, therefore, are well adapted to carry out the objects and attain the ends and advantages mentioned, as well as others inherent therein. While a presently preferred embodiment of the system and method has been given for purposes of disclosure, numerous changes exist in the details of procedures for accomplishing the desired results. These and other similar modifications will readily suggest themselves to those skilled in the art, and are intended to be encompassed within the spirit of the system and method disclosed herein and the scope of the appended claims.

What is claimed is:

1. An actuating apparatus for operating a valve assembly having a valve body, a valve member in the valve body, a valve stem attached to the valve member, and a profile on an end of the valve stem distal from the valve member, the apparatus comprising:
   an actuator body that selectively couples to the valve assembly;
   an actuator stem that has an end that extends into the actuator body;
   an adapter assembly in the actuator body having a threaded end that extends towards the actuator stem, and a profiled end distal from the threaded end that engages the profile on the valve stem and couples to the valve stem, so that selectively applying axial forces to the adapter assembly moves the valve stem and the valve member, wherein;
   the profile includes an annular groove and the profiled end of the adapter assembly moves radially inward to engage the profile;
   an actuator downstop having one end engaged with the actuator stem and an opposite end connected to the threaded end of the adapter assembly;
   an anti-rotation member on the threaded end of the adapter assembly accessible by a tool to prevent rotation of the adapter assembly when the actuator downstop is rotated;
   wherein the adapter assembly comprises an adapter shaft and a connector collar assembly that has a collar end surface facing away from the adapter shaft that lands on an end of the valve stem and provides an axial load transfer path between the adapter shaft and the valve assembly;
   a retainer that attaches the connector collar assembly to a connector housing located at the profiled end of the adapter assembly; and
   wherein the retainer comprises external threads on an outer diameter of the connector collar assembly that engage internal threads of an inner cavity of the connector housing.

2. The actuating apparatus of claim 1, further comprising a biasing member having a static end that engages the valve assembly and a dynamic end that travels axially with the actuator downstop, the biasing member urging the actuator downstop away from the valve assembly.

3. The actuating apparatus of claim 1, wherein the connector collar assembly has an inner bore for receiving the profiled end of the adapter assembly, the inner bore having a radial shoulder defining a transition of an inner diameter of the inner bore from a smaller inner diameter at an open end of the inner bore to a larger inner diameter of the inner bore.

4. The actuating apparatus of claim 1, wherein the connector collar assembly includes a frusto-conical shaped collet member that comprises a plurality of generally axially oriented collet fingers.

5. The actuating apparatus of claim 4, further comprising a rotating nut that moves axially away from the adapter shaft, causing the collet fingers to move radially inward.

6. A method for mounting an actuating apparatus to a valve assembly having a valve body, a valve member in the valve body, a valve stem attached to the valve member, and a profile on an end of the valve stem distal from the valve member, the method comprising:
   connecting a proximal portion of an actuator body to the valve assembly;
   providing an adapter assembly, the adapter assembly having a threaded end with an anti-rotation member, and a profiled end distal from the threaded end;
   engaging the profile of the valve stem with the profiled end of the adapter assembly by moving the profiled end of the adapter assembly radially inward to engage an annular groove of the profile;
   placing a static end of a biasing member on the valve assembly and retaining a dynamic end of the biasing member with an actuator downstop of the actuating apparatus;
   threading the actuator downstop onto the threaded end of the adapter assembly while preventing rotation of the adapter assembly by engaging the anti-rotation member with a tool, and compressing the biasing member between the valve assembly and the actuator downstop; and
   securing a distal portion of the actuator body to the proximal portion.

7. The method of claim 6, further comprising before connecting the proximal portion of the actuator body to the valve assembly, removing a prior actuator assembly from the valve assembly.

8. The method of claim 6, wherein the adapter assembly has a connector collar assembly and a connector housing located at the profiled end and having an inner cavity and wherein the step of engaging the profile of the valve stem with the profiled end of the adapter assembly includes circumscribing the profile of the valve stem with the connector collar assembly and retaining the connector collar assembly within the inner cavity of the connector housing.

* * * * *